C. H. MOSS.
AMUSEMENT ROUNDABOUT WITH MECHANICAL FLIGHT AND TILTING ATTACHMENTS.
APPLICATION FILED SEPT. 23, 1913.
1,101,141.
Patented June 23, 1914.
4 SHEETS—SHEET 3.
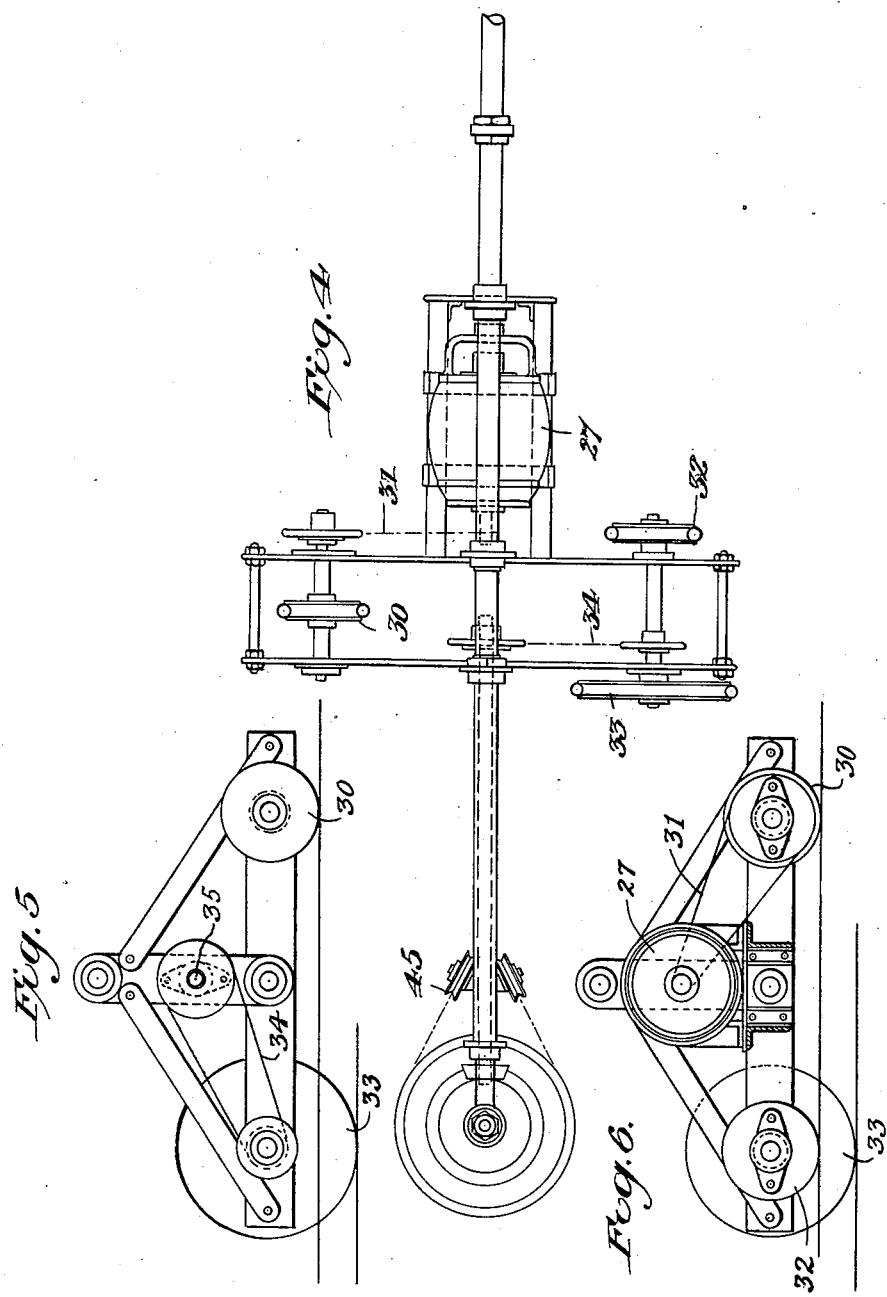

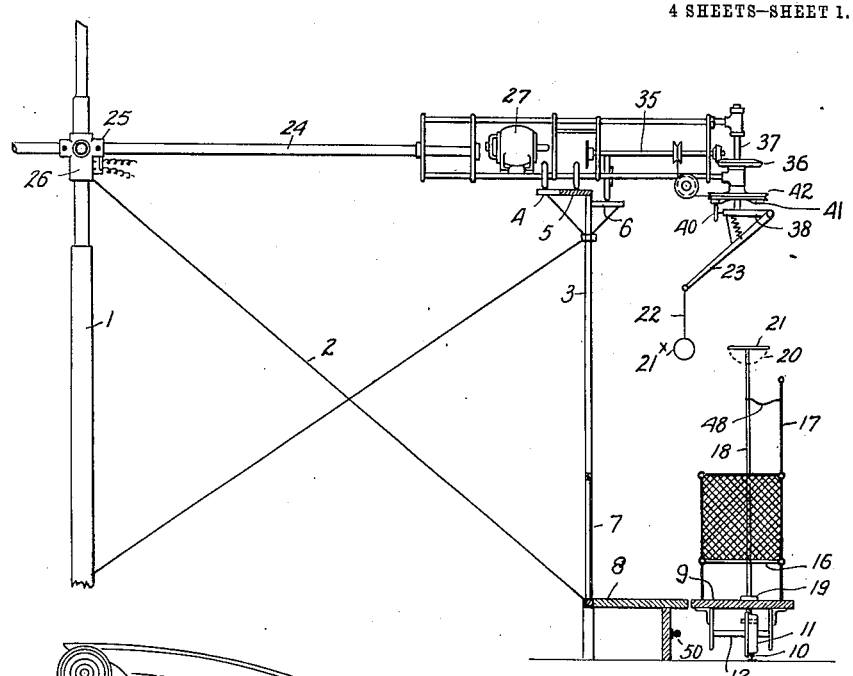
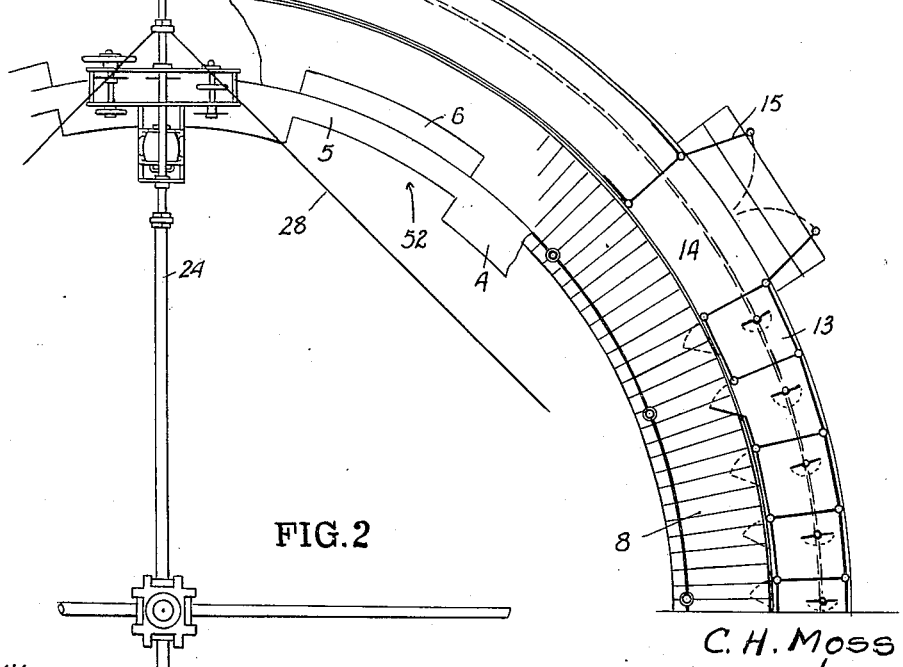

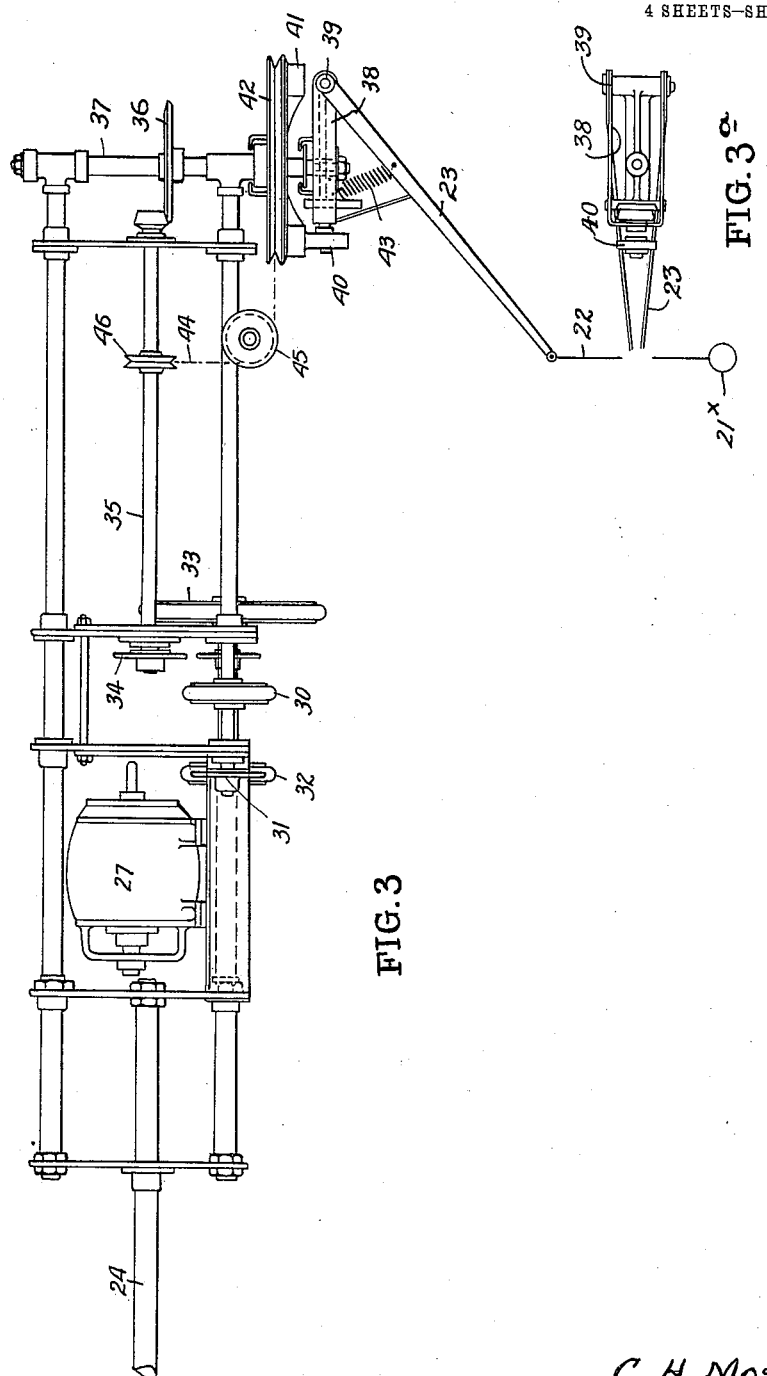

C. H. MOSS.
AMUSEMENT ROUNDABOUT WITH MECHANICAL FLIGHT AND TILTING ATTACHMENTS.
APPLICATION FILED SEPT. 23, 1913.
1,101,141.
Patented June 23, 1914.
4 SHEETS—SHEET 4.
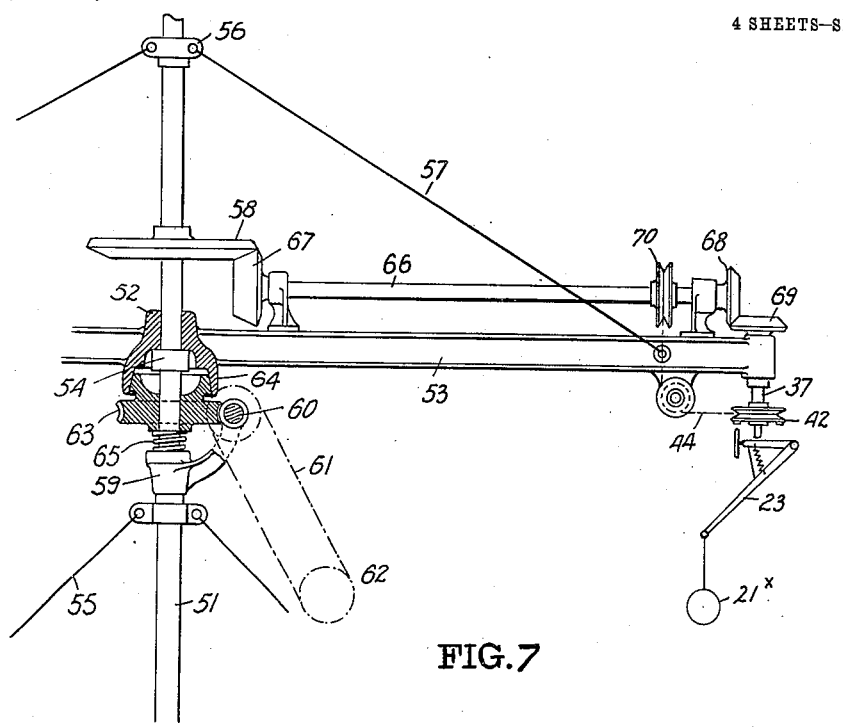
FIG. 7
FIG. 9
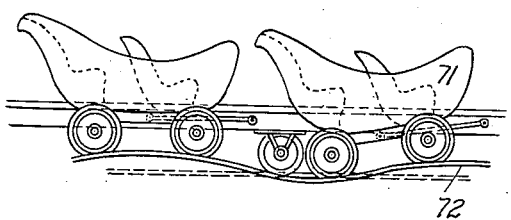
FIG. 8
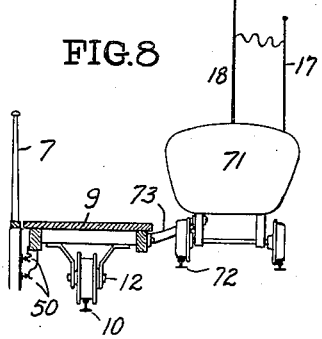
Witnesses:—
Fred G. Pohl
May G. Luttrell
C. H. Moss,
Inventor.
By J. Croydon Marks,
Attorney.
COLUMBIA PLANOGRAPH CO., WASHINGTON, D. C.

UNITED STATES PATENT OFFICE.

CHARLES HUTTON MOSS, OF WELLINGTON, NEW ZEALAND.

AMUSEMENT-ROUNDABOUT WITH MECHANICAL FLIGHT AND TILTING ATTACHMENTS.

1,101,141.   Specification of Letters Patent.   Patented June 23, 1914.

Application filed September 23, 1913. Serial No. 791,330.

*To all whom it may concern:*

Be it known that I, CHARLES HUTTON MOSS, subject of the King of Great Britain and Ireland, residing at New Commercial Hotel, Wellington, New Zealand, but temporarily of 21 Courtfield Gardens, South Kensington, London, England, have invented certain new and useful Improvements in Amusement - Roundabouts with Mechanical Flight and Tilting Attachments, of which the following is a specification.

This invention relates to an amusement device particularly adapted for erection outdoors, and consisting of a horizontal ring platform supporting seats or "carriages" and fitted with means for rotating it around a central structure, a central pole bearing radial arms fitted with means for revolving said arms about it and for operating certain mechanical devices by means of which models of birds or animals are moved about in irregular directions over the carriage way, these models forming objects which it is the purpose of the persons riding in the carriages to strike or catch while the apparatus is in movement.

The invention is illustrated in the accompanying drawings, in which the proportionate sizes of some of the parts are exaggerated for the purpose of better explanation.

Figure 1 is a sectional elevation showing the central pole, one of the overhead arms, the fixed structure and the platform with carriage thereon. Fig. 2 is a corresponding plan being a quarter plan of the complete structure. Fig. 3 is an enlarged detail elevation of the fittings on the outer end of the overhead arm, Fig. 3ª being a plan detail of the bracket on which the models are hung; Fig. 4 is a top plan corresponding with Fig. 3; Figs. 5 and 6 are transverse sectional elevations illustrative of the running gear on the overhead arms. Fig. 7 is a sectional elevation of one of the radial arms and its mountings and attachments in a modified arrangement in which the mechanical details are varied; Fig. 8 a fragment transverse sectional elevation exhibiting a modified arrangement of the rotating platform and the "boats" or carriages; and Fig. 9 a side elevation of two of the "boats" or carriages, shown running on an undulating track.

1 is a central pole which is stayed by guy wires 2. The upper portion of this pole may form the central support for a conical roof covering the whole structure.

3 are stanchions supporting overhead ring tracks 4, 5 and 6 and supporting also a ring fence 7 preventing access of the public within.

8 is a fixed ring platform around the fence 7.

9 is a ring platform revoluble on a horizontal rail track 10 and set flush with the fixed platform 8.

11 are flanged wheels on axles 12 fitted at intervals under the moving platform 9. Electric motors (not shown) may be supported on the platform 9 and motion transmitted therefrom to the axles 12 for the purpose of moving the ring track 9 around the structure on its supporting rail 10. These motors are fed with current taken by brushes off feeder rails 50 fixed under the overhanging portion of the track 8. The surface of the ring platform 9 is subdivided up into a number of compartments 13, shown in Fig. 2. At one or more places an open gap 14 is left provided with closing gates 15 by means of which public access may be had to the inner track 8 and thence to the carriages 13, the object being that the person in charge can admit as many persons as the apparatus is designed to accommodate and then close the gates 15. The outer sides of the carriages 13 being completely closed, risk of accident through ejecting a rider through centrifugal action is obviated. Each of the carriages 13 is fitted with a seat 16, a light staff 18 and a stanchion 17; said staff is set loosely in a hole in the platform floor forward of the seat 16 and is fitted at the lower end with a stop 19 which prevents its withdrawal. At its upper end it carries a catching net 20 on a ring 21. The ring 21 may be joggled in one place so as to better facilitate the catching of the flying models, it being intended that persons riding in the carriages shall use the staffs 18 and the net bags 20 thereon for the purpose of catching the models 21ˣ and pulling the same off the string attachments 22 by which they are hung to the outer end of the swinging arm 23.

The purpose of the overhead construction is to swing the models 21 over the heads of the persons riding the carriages and to impart to the models irregular flying motions in order that the capture of the same may be made very difficult. For this purpose a variety of motions are applied to the swinging arm 23 as will be hereinafter described. The radial arms 24 of which there may be four or more, are pivot connected at 25 to the collar 26 on the pole 1. Below the pivot connection 25 are a pair of rings which form the terminals of an electric circuit. Brushes rub on these rings completing the circuit through the motor or motors 27 by which the overhead arms are caused to move in a circular horizontal path. A motor 27 may be applied on each arm or one motor only may be used to operate the entire overhead structure. The several arms, whether two or more in number, are guyed or trussed together by wires such as 28 so as to maintain rigidity as between them.

The middle circular track 5 is continuous. Upon it runs the rubber shod wheel 30 which is chain belted at 31 to the motor 27. The track 4 is interrupted, portions being omitted from it as at 52, Fig. 2, while the track 6 consists of a number of riding sections placed opposite the interrupted portions 52 of the track 4. The rubber shod wheel 32 runs on the track 4 and the rubber shod wheel 33 which is of larger diameter than the wheels 30 and 32 runs on the discontinuous track 6. The axle of the wheels 33 and 32 is chain belted at 34 to the spindle 35. This spindle is bevel geared as shown at 36 to the vertical spindle 37 which carries at its lower end a cross head 38 one end of which 39 pivotally supports a swinging arm 23 and the other end of which is fitted with a roller 40 which coacts with the irregular track 41 on the lower side of the belt wheel 42. A spring 43 tends to support the weight of the swinging arm 23. The wheel 42 is geared through a flexible belt 44 and fair lead pulleys 45 to a pulley 46 on the shaft 35.

In Fig. 7 is shown a simpler arrangement for supporting the vertical spindle 37 and applying movements to the swinging arms 23. In this arrangement the central post 51 is fixed and the collar or hub 52 carrying the radial arms 53 is rotatable upon it, the weight at the hub 52 being taken on a collar 54. The post 51 is stayed by guys 55 and the radial arms 53 are hung by their outer ends to a rotatable collar 56 near the top of the post by means of guy wires 57. A bevel crown 58 is fixed on the post 51 and there is also fixed on it a bracket collar 59, the outer end of which forms a bearing for a worm shaft 60 which is driven by belt gearing 61 from a motor 62 set in any convenient position. A worm wheel 63 rotatable on the post 51 and engaged by the worm 60 serves to apply rotary motion to the radial arms 53. A boss on the upper side of the worm wheel 63 may be formed as the male member of a cone clutch engaging a female member 64 on the under side of the hub 52. A helical spring 65 in compression keeps the worm wheel 63 forced upward so that the clutch 64 will remain engaged. Any other convenient drive connection between the worm wheel 63 and the arm hub 52 may be used. Upon each of the arms 53 is mounted a shaft 66 which carries at either end bevel pinions 67 and 68. The bevel pinions 67 engage the fixed bevel crown 58 while the bevel pinions 68 engage the bevel wheels 69 which correspond with the bevel wheels marked 36 in other figures of the drawings. This bevel wheel 69 is keyed to the vertical spindle 37 and this spindle carries on its lower end a belt wheel 42 and other parts as shown also in Fig. 3. In this case the wheel 42 is driven by belt 44 from the pulley 70 keyed on the shaft 66. As shown in Fig. 8 the inner fixed platform 8 may be omitted, and in addition to the rotary platform 9 and trackway 10, an outer trackway 72 concentric therewith is provided on which "boats" or carriages 71 run. The rails 72 forming these outer tracks are curved regularly or irregularly as shown in Fig. 9 so that the carriages or boats will plunge or pitch as they run around the trackway. These carriages or boats are caused to move around the trackway 72 by drag arms 73 which are fixed to the rotating platform 9. One or more electric motors mechanically coupled to the axles 12 and receiving a supply of current from "third rails" 50 serve to operate the trackway 9 and from it the train of boats or carriages 71. Each of the boats or carriages 71 is fitted with a staff 18, stanchion 17, and catch net, and may also be fitted with an outer guard as already described with reference to the arrangement shown in Fig. 1.

Referring to Figs. 1 to 6 the operation is as follows: The gates 15 being opened, persons may enter through the vacant place or places 14 across the annular movable platform 9 on to the fixed platform 8. Thence they may pass into the carriages 13. Upon motion being applied to the apparatus, the circular ring platform 9 and the structures thereon are revolved at any required speed upon the track way 10 around the pole 1 as a center. Meanwhile the motor 27 operates to apply motion to the wheel 30 which runs on the track 5, the arms 24 being thus caused to move around the pole 1 as a center. When the wheel 32 runs on the solid part of the interrupted track 4 it turns and motion is applied through the chain belt 34 to the shaft 35. The motion of the shaft 35 is resolved into a double motion on the cross head 38. That cross head is rotated through the bevel gear 36 and it is caused to oscillate by the contact of its running wheel 40 with the underside of the cam or wavy track 41 on the wheel 42, said wheel 42 being turned by the belt gearing 44. The reciprocating motion applied to the swinging arm 23 is amplified by the flexure of the spring 43. When the wheel 32 is passing over a gap in the track 4, the wheel 33 meets the track 6 and applies motion through the chain gear 34 to the shaft 35 but at a higher speed. The result is that the hanging model 21ˣ is swung around the spindle 37 as a center at varying rates of velocity and is also reciprocated vertically at irregular time periods. Its position in space can therefore not be easily predetermined at any particular moment and its capture by means of the net 20 or the striking of it by means of a tilting rod are trials of skill. Persons riding in the carriages have only limited opportunity of reaching the models inasmuch as the bottom ends of the staffs 18 cannot be raised above the seat 16 and the movements of the upper ends thereof are restricted by the elastic cord 48.

Referring to Figs. 7, 8 and 9, the rotation of the motor 62 turns the worm shaft 60 which in turn rotates the worm wheel 63. This rotary motion is through the clutch 64 applied to the radial arms 53. As these arms move around carrying with them the shafts 66 mounted on them, the bevel pinions 67 are turned by contact with the fixed bevel crown 58 and this rotary motion is applied through the bevel gear 68—69 and the belt 44 to the cross head 38. Irregular motions are thus applied to the swinging arms 23 and the models 21ˣ hung thereon, but the movements are of a different order from those obtained with the more complicated arrangement detailed in the previous figures of the drawing. The ring platform 9 is moved around the circular fence 7 by means of electric motors turning the axles 12 and receiving feed current from the third rails 50, or the platform is otherwise rotated. Its rotary motion is applied through the drag arms 73 to the train of boats or carriages 71. The boats or carriages 71 and the rotary track 9 therefore move around together, and an attendant on the rotary platform 9 may therefore have access to any one of the boats or carriages 71. At intervals, one of the boats or carriages 71 may be omitted and a blank platform with gate fitted in its place to facilitate ingress and egress of passengers to the platform 9 while the carriages are at rest. This is a convenient arrangement for facilitating admission and exit of passengers as already described with reference particularly to Fig. 2.

What I claim as my invention and desire to secure by Letters Patent is:—

1. An amusement roundabout comprising a fixed central pole, a trackway concentric therewith, wheel mounted boats or carriages on said trackway, means for propelling said boats or carriages, radial arms rotatable around said pole and extending over said boats or carriages, a rotatably mounted cross-head on the outer end of each of said radial arms, a swinging arm supported on each said cross-head, and means for moving said radial arms around said pole as a center and for applying rotary and oscillating movements to said swinging arms.

2. An amusement roundabout comprising a train of boats or carriages movable around a circular track, radial arms movable over said track above said boats or carriages, swinging arms to which irregular motions are applied by mechanical gearing supported at the outer ends of said radial arms above said boats or carriages, detachable models freely hung from the ends of said swinging arms, and means for applying motion to said radial arms and said gearing and for propelling said boats or carriages.

3. In a roundabout of the type described, radial arms rotatable around a central post, a circular track supporting the outer ends of said radial arms, interrupted tracks engaging wheels operating gearing supported on said radial arms and swinging arms on the outer ends of the radial arms, to which swinging arms irregular rotary and oscillating movements are applied by said gearing, substantially as herein described.

4. In a roundabout of the type herein described, a fixed post, radial arms centered thereon and movable around the same by gearing from a fixed motor, a fixed crown wheel on said post gearing with bevel pinions on shafts supported on said radial arms, and gearing operated by said shafts applying oscillating and rotary movements to swinging arms supported at the outer ends of said radial arms, substantially as herein described.

5. In a roundabout of the type herein described in which detachable hanging models are swung in irregular paths over a circular track, the combination of a fixed circular platform, a track concentric with and surrounding same and a rotatable platform mounted on said track and supporting boats or carriages, and means for rotating said platform on said track, substantially as herein described.

6. In a roundabout of the type herein described, means for applying irregular motions to the cross heads on which the swinging arms are mounted, said means comprising interrupted tracks and wheels making contact therewith and geared to shafts associated with the swinging arms operating mechanism, substantially as herein described.

7. In a roundabout in which detachable hanging models are swung in irregular movements over a circular track, a rotatable circular platform, and concentric therewith an undulating track on which boats or carriages run, drag arms connecting the train of boats or carriages to the rotary platform, and means for applying motion to said platform, substantially as herein described.

In testimony whereof I have affixed my signature in presence of two witnesses.

CHARLES HUTTON MOSS.

Witnesses:
BERTRAM H. MATTHEWS,
WALTER J. SKERTEN.